INVENTORS
JOHN B TAIT
LEO C KAYE

BY [signature]

AGENT

June 5, 1962

J. B. TAIT ET AL 3,038,148

APPARATUS FOR INCREASING THE STORAGE CAPACITY OF A MAGNETIC DRUM

Filed April 25, 1958

12 Sheets-Sheet 3

June 5, 1962 J. B. TAIT ET AL 3,038,148

APPARATUS FOR INCREASING THE STORAGE CAPACITY OF A MAGNETIC DRUM

Filed April 25, 1958 12 Sheets-Sheet 6

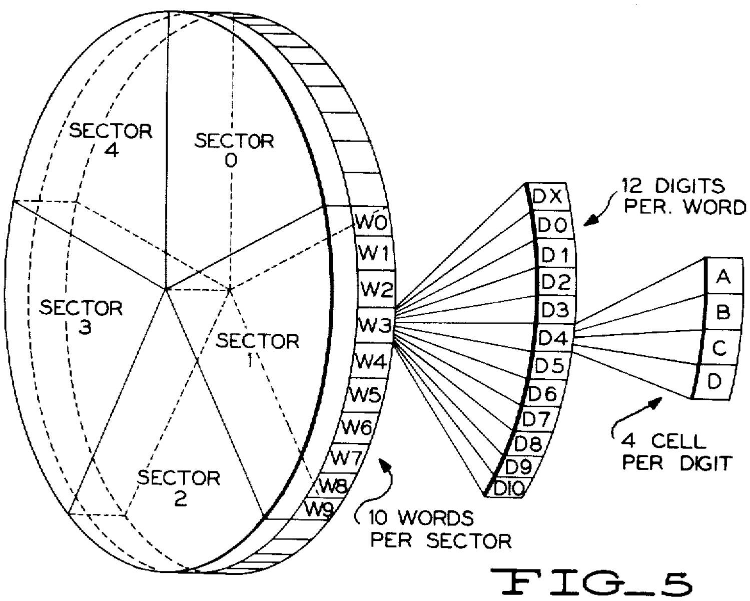
FIG_5
5 BIT CODE
| DIGIT | 6 | 3 | 2 | 1 | 0 |
|---|---|---|---|---|---|
| 0 | | | X | X | |
| 1 | | | | X | X |
| 2 | | | X | | X |
| 3 | | X | | | X |
| 4 | | X | | X | |
| 5 | | X | X | | |
| 6 | X | | | | X |
| 7 | X | | | X | |
| 8 | X | | X | | |
| 9 | X | X | | | |
FIG_6
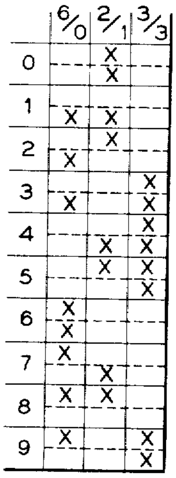
FIG_7

United States Patent Office 3,038,148
Patented June 5, 1962

3,038,148

APPARATUS FOR INCREASING THE STORAGE CAPACITY OF A MAGNETIC DRUM

John B. Tait, Vestal, and Leo C. Kaye, Endwell, N.Y., assignors to International Business Machines Corporation, New York, N.Y., a corporation of New York Filed Apr. 25, 1958, Ser. No. 730,907
4 Claims. (Cl. 340—174.1)

The invention concerns data processing computers and, more specifically, to means for increasing the capacity of the memory or storage device of the computer; for example, a mechanical drum storage without mechanical modification of the drum.

The constant growing demand in business and scientific applications has brought about the need for larger and faster data processing means. This demand has been filled in part by larger but more expensive computers. However, a question of economy arises whenever owners of existing computers are faced with an immediate need to process volumes of data in excess of the rated capacities of existing computers.

The principal object of the invention provides for increasing the storage capacity of computers without need for mechanical replacement of the magnetic storage devices and without need for speeding up their operations.

Another object resides in increasing the data storage capacity of magnetic memory devices; for example, a magnetic drum by means of a band compression scheme which in effect increases the bit density and, hence, the drum frequency of operation without increase in speed of operation and yet maintaining the basic frequency of operation of the computer or data processing system.

A specific object resides in the method and means for increasing the data storage capacity of a magnetic drum, or the like, by means of a band compression scheme whereby data previously occupying two tracks of a band are compressed into a single track, thus doubling the bit density of the band and yet maintaining the basic frequency of operation of the system.

Yet a more specific object resides in the method and means for increasing the data storage capacity of a magnetic drum, or the like, by means of a band compression scheme whereby data coded in accordance with a five bit representation and occupying five tracks of a drum band are compressed into two and one-half drum tracks, thus doubling the bit density, yet maintaining operations in accordance with the basic frequency of the data processing system.

Other objects of the invention will be pointed out in the following description and claims and illustrated in the accompanying drawings, which disclose, by way of examples, the principle of the invention and the best mode, which has been contemplated, of applying that principle.

In the drawings:

FIG. 5 shows generally how the computer drum surface is divided with respect to sectors, words, digits, and cells.

FIG. 6 shows how the "5" bit code is constituted.

FIG. 7 shows how the "5" bit code of FIG. 6 is compressed from five tracks to three tracks.

Figure 8A:
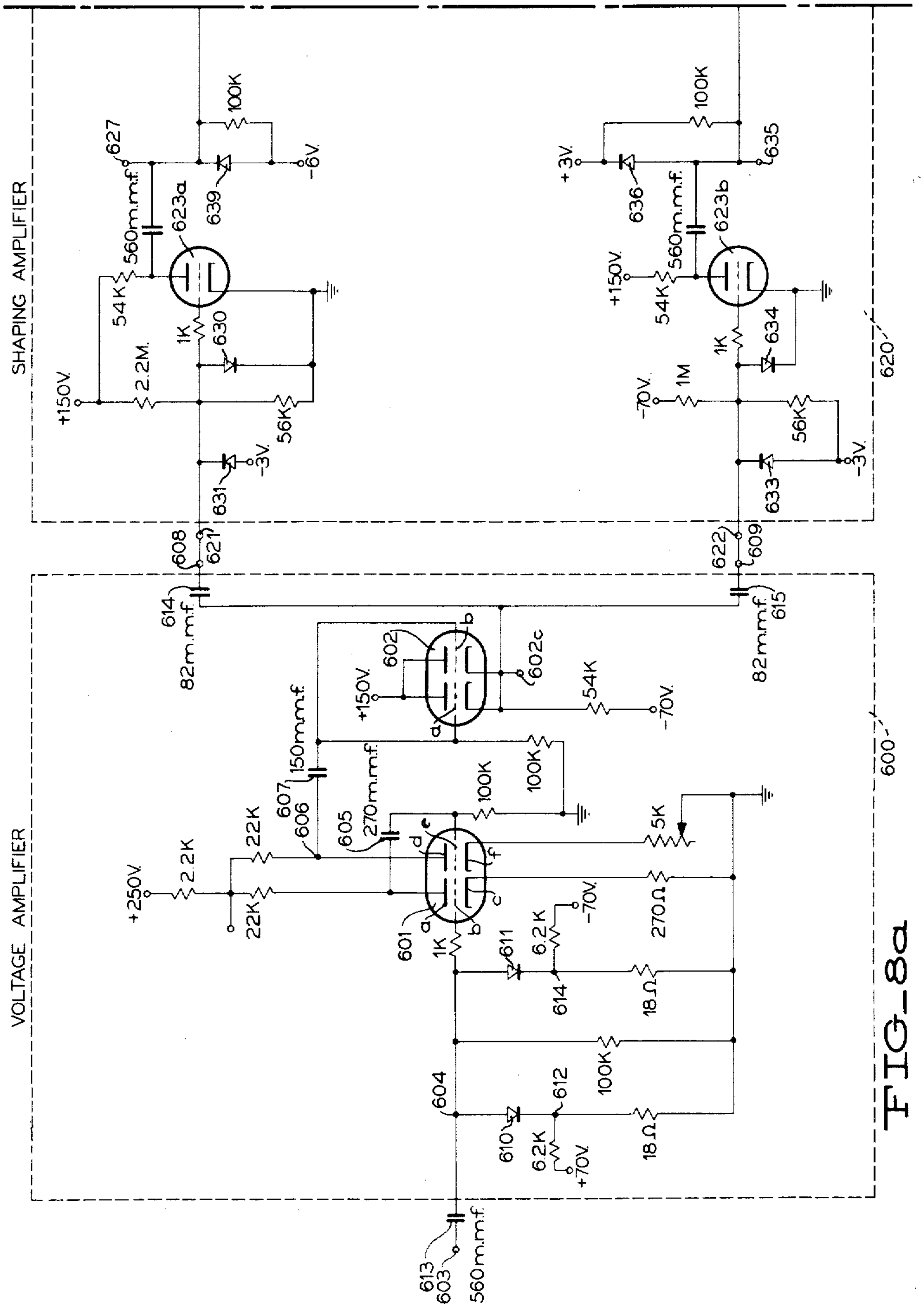
Figure 8B:
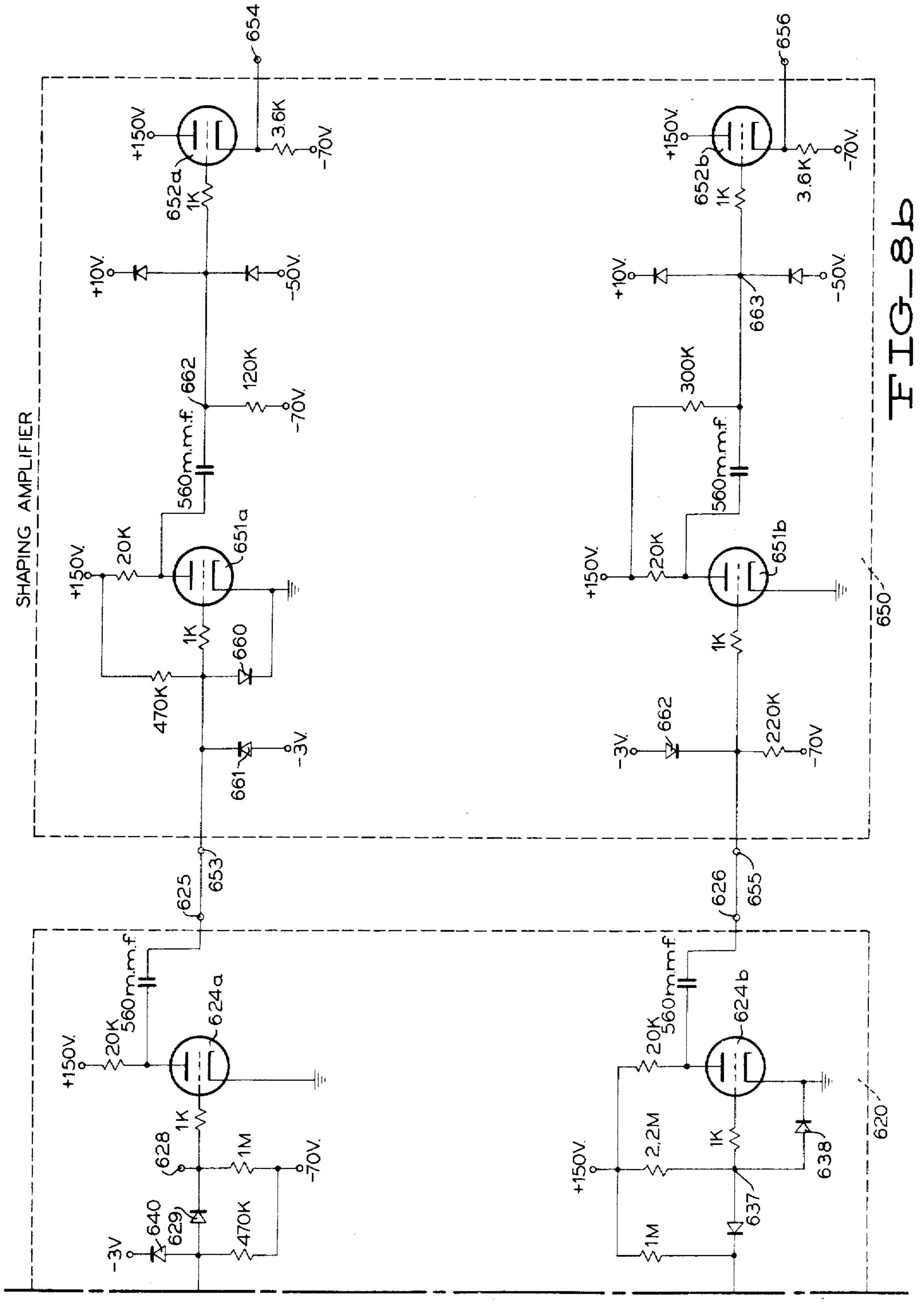

FIGS. 8*a* and 8*b* show the details and the corresponding block representations for a voltage amplifier and shaping amplifiers.

Figure 9:
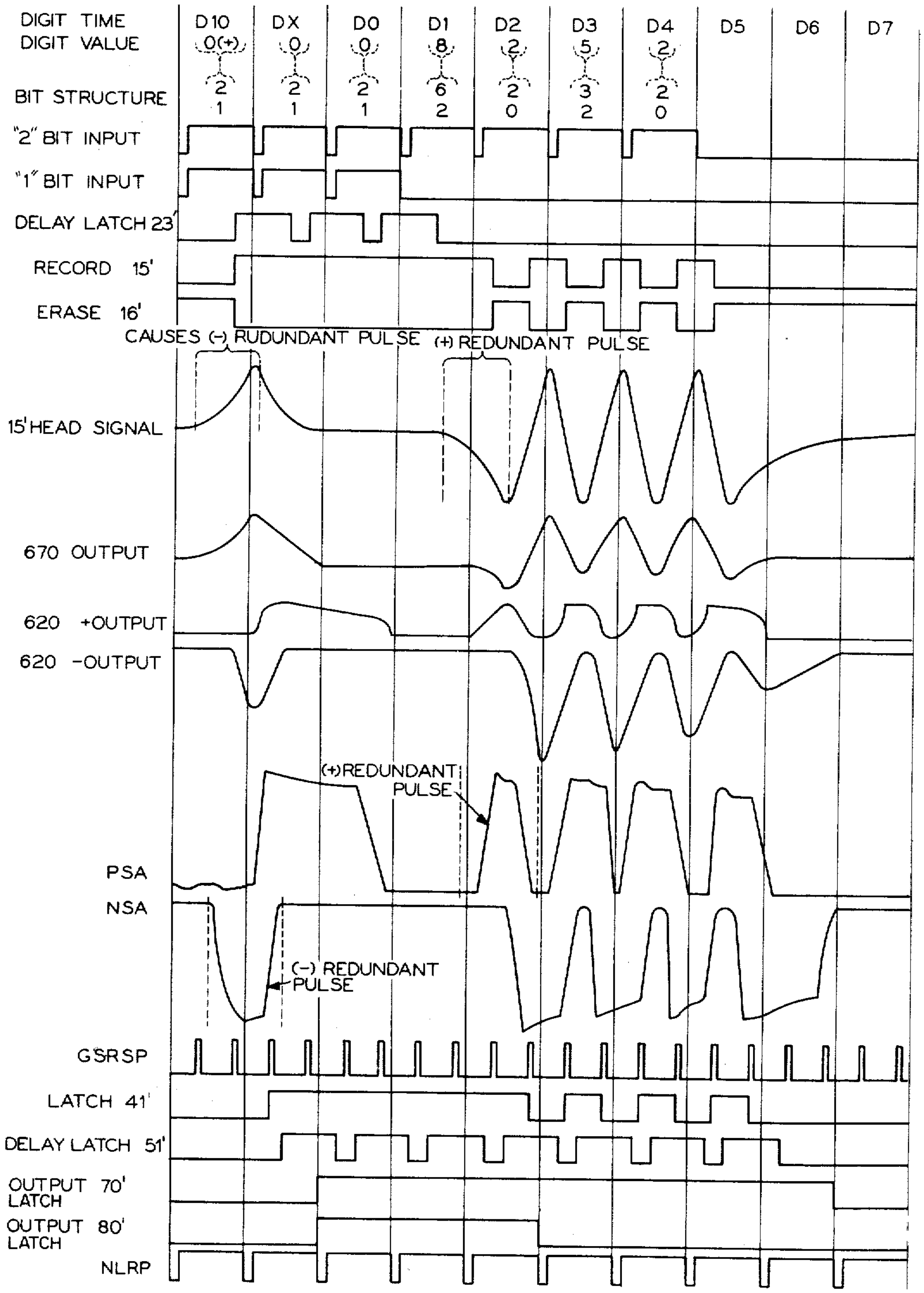

FIG. 9 shows the variety of waveforms including those generated by the voltage amplifiers and the shaping amplifiers.

Figure 10:
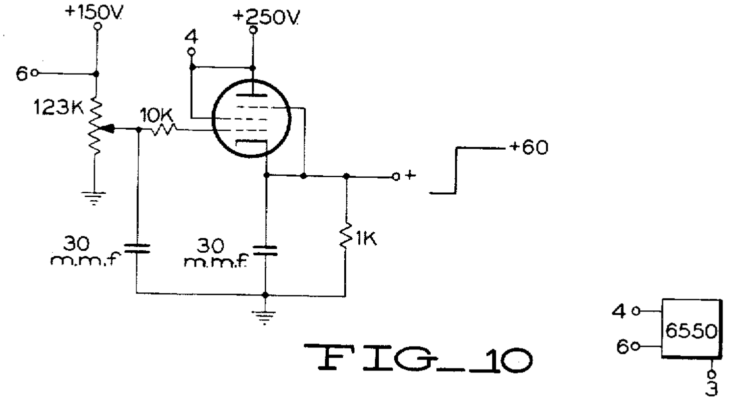

FIG. 10 shows the details and block form of a power pentode.

Figure 11:
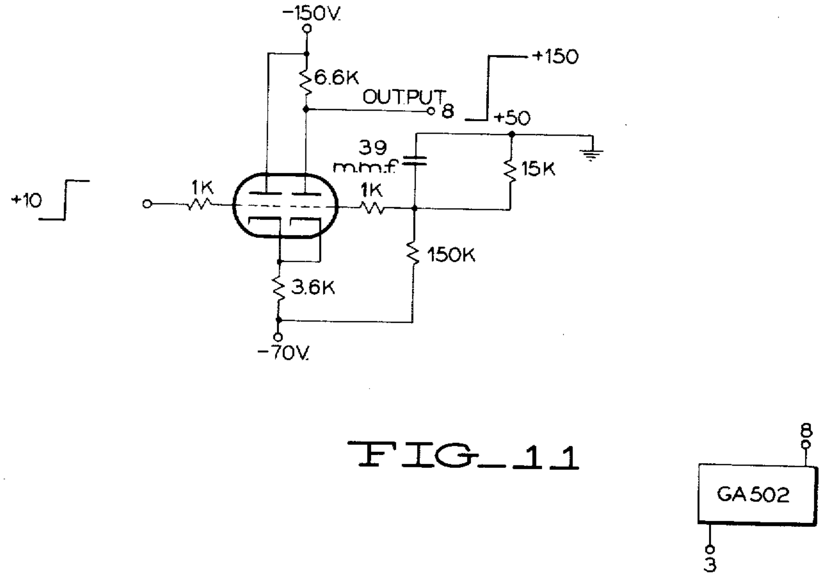

FIG. 11 shows the details and block form of a grounded grid amplifier.

In general, the invention contemplates increasing the capacity of an existing magnetic storage means, for example, a magnetic drum, of the type employed in existing data processing equipment and computers. The capacity increase is effected in a novel manner by means of a band compression scheme which, in effect, compresses data into a smaller area of the drum during a writing operation, and, thereafter, reads the compressed data and passes it through "decompressing" means to restore the data to its original (or expanded) form so that it may be processed by the computer operating at a fixed pulse repetition rate (frequency of operation). The advantage of this novel approach is that the drum and its fixed timing tracks are not altered in any manner nor is the speed of rotation of the drum changed from its normal rate of rotation. In effect, the computer utilizing such a scheme operates at one frequency while the drum operates at an increased frequency depending upon the degree of compression employed. Thus, a code of "*n*" bits could be compressed into an area $1/n$ as large as that previously occupied. More specifically, if the bit density were doubled or tripled, as the case may be, the drum frequency would correspondingly be increased or tripled while speed of the drum or its physical characteristics remain unchanged.

In order to facilitate an understanding of the invention, it might be desirable to describe briefly some of the physical and timing characteristics of the computer drum as well as the code employed together with some pertinent information concerning the computer. Such a computer may be of the type shown and described in a pending Hamilton et al. application filed November 2, 1955, Serial No. 544,520, now Patent Number 2,959,351, and assigned to the common assignee. In this Hamilton et al. application the computer frequency is fixed at 125 kc. under control of a drum having a capacity of 2,000 words of information. Thus drum shown in diagrammatic form in FIG. 5 of the instant application comprises five sectors 0, 1, 2, 3, 4; each sector containing ten words. Each word contains 12 digit slots with the data word itself utilizing ten digits (D1 through D10) plus a sign (digit 0), leaving one unused slot, namely DX, which DX slot is used for switching purposes. As further seen in FIG. 5, each digit slot is further divided into four equally spaced cells designated A, B, C, D; each digit slot has a time duration of eight microseconds and each cell having a time duration of two microseconds. The drum is provided with appropriate timing tracks for generating on each revolution thereof, a home pulse (HP) five sector pulses (SO, S1, S2, S3, S4) fifty word pulses; i.e., ten pulses namely W0–W9 within each sector, 600 digit pulses (12 pulses within each word, namely DX, D0, D1–D9), 600 B pulses, 600 D pulses and 600 read sample pulses (RSP). These basic timing signals are used to generate other signals for controlling the various operations of the computer; among such generated pulses are A pulses, C pulses and write sample pulses (WRS) each of two microseconds' duration, and other pulses which will be explained at a more appropriate time.

The Hamilton et al. computer employs two different code systems; one of which, namely a five bit code, shown in FIG. 6, is used for storing words of data and instructions in the general storage (GS) area of the drum, which area has a capacity of 2,000 words. As further described in said Hamilton et al. application, five drum tracks are employed to store 50 words around the circumference of the drum, the five tracks constituting a band, and 40 such bands constituting the 2,000 words of storage of said drum. Each band has five write/read heads, one for each track to write or read an appropriate one of the five bits, 6, 3, 2, 1, 0.

In writing on or reading data from the drum, an address matrix selection system is employed which locates a specific word area of the drum. This matrix system is controlled by a four position address register that specifies any one of the 2,000 word locations, or addresses, of the drum, according to address numbers 0000 to 1999. In the instant application, the same principle of address matrix selection is employed to select any one of 3,500 drum locations according to addresses 0000 to 3499, although 4,000 locations could be realized if the system of the invention were fully exploited. Because of immediate practical considerations, it was considered more economical to compress the five bit code from five tracks to three tracks rather than from five tracks to two and one-half tracks. The compressed form of the five bit code is shown in FIG. 7.

Here it is noted that the bit density is doubled. In other words, where a single cell previously contained a single bit the same cell now contains two bits. It is further noted that bits "6" and "0" are written by one head, bits "2" and "1" written by another head, and bit "3" written by a third head. The "3" bit in this instance may occupy the whole cell or it may share the cell with another "3" bit from a different band of information. Bits grouped in this manner are referred to hereinafter as paired bits. Now if the choice is made that all cells should contain double bits, then two bands of five tracks each could be compressed into a single band of five tracks, each track containing twice the number of bits that it previously contained. It may be appreciated that the optimum in band compression is realized when the bits of all tracks are compressed into a single track. Thus, in the present instance if all five bits of the code in question were compressed into a single channel, the storage capacity of the drum would be increased fivefold, and so the drum frequency would be increased accordingly fivefold, while the computing system would be operating at its basic frequency rate which would be one-fifth of the compressed drum bit frequency.

*Drum Address Selection*

The address register contains the four digit address in two out of five code form. The head selection circuits for the drum select the three heads of a drum band for reading or writing by interpreting the meaning of the address register output. The function of each address register position for static selection is as follows:

The thousands position of the address register is analyzed for a decimal value of 0, 1, 2, 3. This divides the drum into four groups. The 0XXX group (for words 000–0999), the 1XXX group (for words 1000–1999), and the 2XXX group (for words 2000–2999), each contain a thousand words or 20 bands. The 3XXX group (for words 3000–3499) contains 500 words or 10 bands because of space limitations on the drum.

The hundreds position of the address register may contain values for 0 through 9 and therefore has ten selection signals possible. Each signal locates 100 words or two bands within each thousand group. Words in a given band will be XX00 to XX49 or XX50 to XX99. For selection they are termed 00 band and 50 band.

The tens position of the address register may also contain values 0 through 9 but only two selection signals (00 band or 50 band) are required. The 0, 1, 2, 3, and 4 values are grouped to develop the XX00 signal and the 5, 6, 7, 8, and 9 values are grouped to give the XX50 signal.

The units position of the address register has no bearing on static selection but is used in dynamic selection.

| | |
|---|---|
| "0" in Th—0XXX—20 of 70 bands<br>"1" in Th—1XXX—20 of 70 bands<br>"2" in Th—2XXX—20 of 70 bands<br>"3" in Th—3XXX—10 of 70 bands | Th |
| "0" in Hds—<br>"1" in Hds—2 of 20 bands<br>or<br>2 of 10 bands<br>"9" in Hds—depending on Ths group | H |
| 0, 1, 2, 3, 4 in tens—XX00—1 of 2 bands<br>5, 6, 7, 8, 9 in tens—XX50—1 of 2 bands | T |
| Not used | U |

The static selection circuits are set up as a 2-dimensional matrix. The (2) tens position selection signals are switched with the (10) hundreds position selection signals. This switching is termed vertical selection and locates four bands. That is, band X350 may be in one of four thousands group. The thousands position selection signal (termed horizontal selection) picks out the particular band addressed.

The vertical selection (tens and hundreds position) applies voltage to the plates of the record and erase tubes connected to appropriate proper heads. Diodes eliminate back circuits through heads not selected by vertical selection. The horizontal selection (thousands position) selects the grid of proper thousands tube to write in the proper heads.

After a band has been selected, dynamic selection circuitry selects the one of fifty words in the band. For dynamic selection and other timing purposes, the drum is divided into five sectors (0–4) of 10 words (0–9) each. The units and tens position of the address register are used for locating the correct word and sector.

Figure 1:
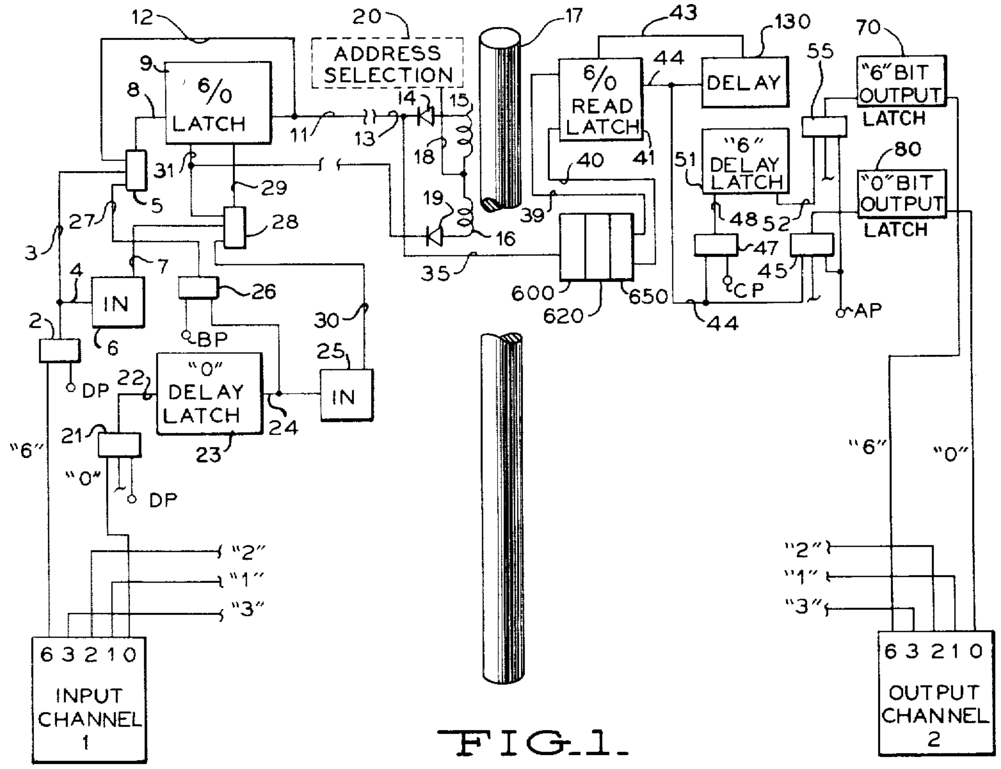
FIG. 1 is a schematic diagram illustrating the principle of the band compression, or folding, scheme of the invention.

The principle of band compression and decompression may be described in general terms with the aid of FIG. 1, which figure is merely an exemplary embodiment showing only as much of the basic components as is necessary to accommodate paired bits "6" and "0" of the five bit code comprised of the bits 6, 3, 2, 1, 0; the structure being the same for accommodating paired bits "2" and "1," while that for accommodating the bit "3" is standard. Accordingly, to avoid any unnecessary duplication of structure and explanation, the following will be limited to an explanation of the operation pertaining to the compression and decompression (or folding and unfolding) of the bits "6" and "0." It is therefore to be understood that the invention is not limited to this exemplary embodiment, nor to the particular computer drum under consideration, but may find use wherever information is stored on magnetic memory devices and wherein increased storage capacity is desired.

The manner of writing paired bit values "6" and "0" representing the decimal value "6" in compressed form under control of a single head is as follows:

The signal representing the "6" bit is issued along an appropriate channel line and entered into an AND circuit 2 and sampled by a D pulse DP of two microseconds' duration to provide a timed output along lines 3 and 4, the latter being connected to an inverter 6 to provide an inverted signal on the output line 7, which output will be explained in due course. The positive output on the line 3 is fed through an OR circuit 5, through its output 8 in turn connected to the input of a 6/0 write latch 9 turning the latter on for a four microsecond record interval. The latch output is fed along output lines 11 and 13, through diode 14, through write head coil 15 the center tap thereof, line 18, and to the address selection box 20, the latter permitting completion of the circuit in the manner earlier explained. Energization of the write head coil 15 causes the "6" bit to be recorded. Since the signal representing the "0" bit is fed concurrently with the "6" bit signal, provision is made to delay the writing of the "0" bit. This delay is effected as follows:

The "0" bit signal is applied to the AND circuit 21 and sampled by a D pulse DP to provide a D timed output along a line 22 connected to the input of a zero delay latch 23. The sampled output turns on the zero delay latch 23 for a period of about six microseconds. The output of the latch is fed along line 24 into an inverter 25 for a purpose to be described in due course, and also into an AND circuit 26 where it will be sampled with a B timed pulse BP to provide a B timed output on a line 27, also connected to the input of the OR circuit 5. The presence of the B timed "0" sampled output on the input of the lach 9 keeps the latch On for another four microsecond recording interval during which interval the "0" bit is written on the drum in the same cell but below the recorded "6" bit and under control of the write head coil 15. Circuit means to be later explained in detail provide for turning the latch 9 off after each four microsecond period of time during the recording of unpaired bits. On the other hand, the record latch 9 will stay on for an entire period of eight microseconds when paired bits are to be recorded by a common head. Moreover, if the channel 1 input has a continuous succession of the same paired bits, the latch 9 will stay on uninterruptedly for a corresponding number of digit interval periods.

Returning now to the explanation of the inverter 6, it will be seen that the line 7 is connected to an input of an OR circuit 28 whose output is connected to the turn off input 29 of the latch 9. The latter will be turned off only whenever a positive signal is supplied by way of the input line 29. Thus, the presence of a "6" bit results in a negative signal on the lines 7 and 29, which negative signal thus prevents the turn off of the latch; however, the absence of a "6" bit results in the application of a positive signal on the lines 7 and 29 to turn off the latch 9.

Since the recording is effected in accordance with the NRZ (non-return to zero) system, appropriate circuits are employed to provide for the recording, not only of the presence of bit information, but also the absence thereof. In the NRZ system the write head coil 15 is energized in the manner explained whenever the latch output 11 is on in response to the presence of "6" bit information. The absence of the "6" bit information is recorded under control of head coil 16 in the following manner:

When the latch 9 is off, signifying the absence of bit information, the off output of the latch 9 provides an up level signal which is issued along line 31, through diode 19, through the head coil 16, the center tap thereof, line 18, and to the address selection box 20. The flow of current through the head coil 15 as earlier explained, causes magnetization in one direction to indicate the presence of bit information, while the flow of current through head coil 16 as just explained, causes magnetization in the reverse direction to indicate the absence of bit information.

The manner of reading the compressed (or folded) information from the drum 17 is effected principally by means of read latch 41 and a delay latch 51 for storing and delaying the readout of the early recorded bit. The reading operation is effected as soon as an appropriate command has been given to the computer. When such a command is initiated and a particular address is specified, the address selection circuits in box 20 will pick up the appropriate circuit line; for example, 18 in the drawing of FIG. 1. This causes the selected head coil 15 to be in readiness to read out magnetized information passing thereunder. In the example at hand, a recorded "6" bit is followed by a recorded "0" bit and these will be read out in the order stated. When the "6" bit is sensed, an appropriate signal will be issued along line 35 to appropriate amplifying and shaping means designated by reference numerals 600, 620, and 650. The latter provides a positive output (PSA) and a negative output (NSA), respectively, on output lines 39 and 40. The PSA and the NSA outputs signifying, respectively, a change to a bit presence and a change to a bit absence and these outputs will turn the read latch 41 on and off depending on the signals received and in the following manner:

Assuming that a "6" bit was read, a PSA signal is fed along a line 39 to turn on the read latch 41 which accordingly provides a positive output on the line 44 connected to an AND circuit 47. This signal will be sampled by a C pulse CP to provide an output on line 48 which then turns on the delay latch 51 to delay the readout of the "6" bit. Four microseconds after the sensing of the recorded "6" bit, the presence of the "0" recorded bit will maintain the issuance of the PSA signal on the line 39 to thereby keep the read latch 41 in its on state for another four microseconds time interval and during which interval the "6" bit output latch 70 and the "0" output latch 80 will be turned on to cause concurrent issuance of both the "6" bit and the "0" bit signals on the output channel 2. The turning on of these latches 70 and 80 are under control of AND circuits 55 and 45 sampled by A pulses AP. This, in general, describes the means for compressing (or folding) and decompressing (or unfolding) coded data. Now there will be described in greater detail the same operation but with reference to FIGS. 4*a* to 4*f*.

Figure 4A:
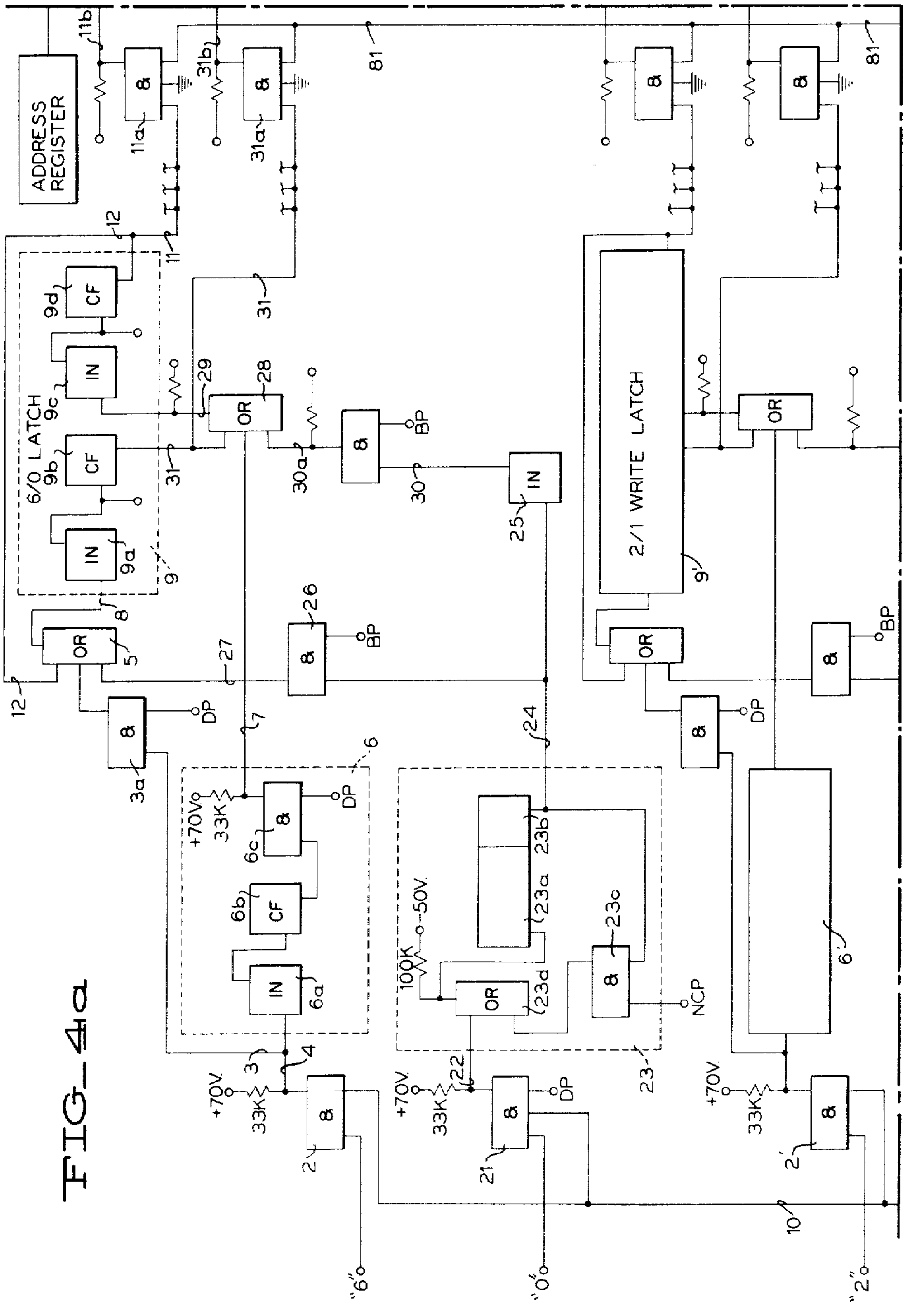
FIGS 4*a* through 4*f* are arranged to form a composite wiring diagram of the invention.

In a writing operation, an appropriate command is fed into the computer which command includes an address for specifying a particular location on the drum. Once the command including the instruction is executed, the appropriate address selection means are energized to select the write head for operation, thereby making the heads operative to the signal bit information passing over the input channel 1. For a detailed understanding of the operation, reference is invited to FIGS. 4*a* and 4*f* and the time charts of FIGS. 2 and 9. In FIG. 4*a*, the "6" bit signal passing into AND circuit 2 is gated with a computer controlled signal (GSRI and ND9) along line 10 to cause issuance of a timed "6" bit signal of two microseconds' duration over lines 3 and 4. The bit signal on the line 3 is again gated with a D pulse DP in AND circuit 3*a* to provide a gated output which passes through the OR circuit 5, line 8, to turn on the latch 9. The latter is comprised essentially of inverters 9*a* and 9*c*, and cathode followers 9*b* and 9*d* connected in the manner shown. The latch 9 also includes a latch back path 12 and the output lines 31 and 11, the former providing a negative level while the latter provides a positive level whenever the latch 9 is on. Conversely, when the latch is off, the line 31 provides a positive level while the line 11 provides a negative level. As earlier mentioned, the latch 9 is turned off under control of a positive signal passing through the OR circuit 28 and into the turn off line 29. When the latch 9 is on, indicating the presence of a "6" bit, the output line 12 is up and this up level is gated with an address selection signal transmitted over a line 81 to render AND circuit 11*a* effective to provide a gated output over a line 11*b*. The latter is fed to a grid input of a power pentode 110 shown in detail in FIG. 10. The power pentode provides a positive output from its cathode, which output is transmitted over a line 111 to appropriate amplifying and shaping circuits contained in a box 112 shown in FIG. 4*b*.

Figure 2:
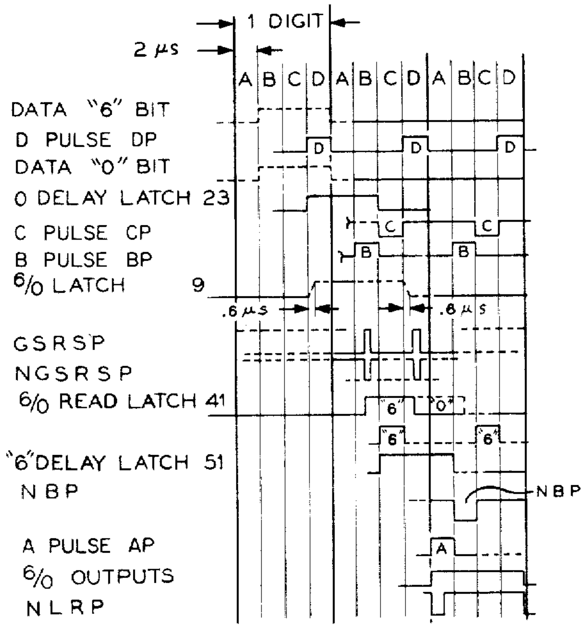
FIG. 2 is a time chart relating to the band compression scheme of operation.
Figure 3:
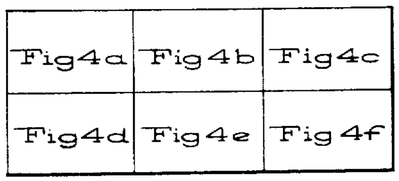
FIG. 3 is a block diagram showing how

These amplifying and shaping circuits are similar to those employed for the same purpose described in the afore-mentioned Hamilton et al. application. The output from the amplifier and shaping means 112 is transmitted over the line 13 to energize the write head 15 in the manner earlier explained to record the "6" bit. It may be seen in FIG. 4*a* that the latch output line 31 is fed into an AND circuit 31*a* where it is gated with the address select signal transmitted over the line 81. The output from the AND circuit 31*a* is passed over line 31*b* to the input grid of power amplifier 110*a*, which is similar to the amplifier 110 previously mentioned. The amplifier 110*a* provides a negative output when the amplifier 110 provides a positive output. The negative output of the power amplifier 110*a* is ineffective due to the blocking action of the diode 19. When the power amplifier 110*a* provides a positive output, signifying the absence of a "6" bit, write coil 16 will be energized to record this condition. The inverter means 6 previously referred to includes an inverter 6*a*, a cathode follower 6*b* and an AND circuit 6*c*, connected in the manner shown to provide a D timed output in response to the absence of the "6" bit. The zero delay latch 23 includes a block 23*a* which contains a pair of inverters connected in series relation, a cathode follower 23*b*, and an AND circuit 23*c* which gates the latch output with a negative C pulse (NCP) and provides an output which passes through an OR circuit 23*d* connected to the input of the double inverter 23*a*. The "0" bit signal fed to the AND circuit 21 is gated with a D timed pulse DP and fed as a D timed output through the line 22 to turn on the delay latch 23. The output from the latter is fed through the line 24 into the AND circuit 26 where it is sampled with a B pulse BP. The relationship of the "6" bit and "0" bit information signals, the latch outputs controlled by the latches 9 and 23 as well as other pertinent signals are shown in FIG. 2.

When a read operation is initiated under control of an appropriate computer instruction and the particular read head is selected to read the magnetized areas of the drum, the appropriate decompressing, or unfolding, circuits will be energized to read out paired signals; i.e., those recorded and read from the same cell locations, and to effect concurrent issuance of these paired bit signals upon channel 2 of the computer. The signals generated by the read head coil, in response to the reading of recorded information, will be issued through the line 35 to a block 670, which contains means for signal level restoration. This means is similar to that used for the same purpose in the afore-mentioned Hamilton et al. application. The signals issued from the means 670 are fed into the voltage amplifier block 600, through the shaping amplifier 620 and then into and out of the shaping amplifier 650 by way of output lines 39 and 40—through which are issued respectively the positive signals PSA and the negative signals NSA.

The amplifying and shaping means 600, 620, and 650 are shown in detail in FIGS. 8*a* and 8*b* and described in detail later on in the specifications under appropriate titles. Appropriate waveforms issued by these means are shown in FIG. 9. As earlier mentioned, the shaping amplifier 650 provides PSA signals in response to the reading of bits "6" and "0," and NSA signals in response to the absence of bits in the cells being read. The line 39 accordingly is directed to turn on the latch in response to bits "6" and "0" read, while the line 40 is directed to turn the latch 41 off in response to the absence of these bits.

Figure 4B:
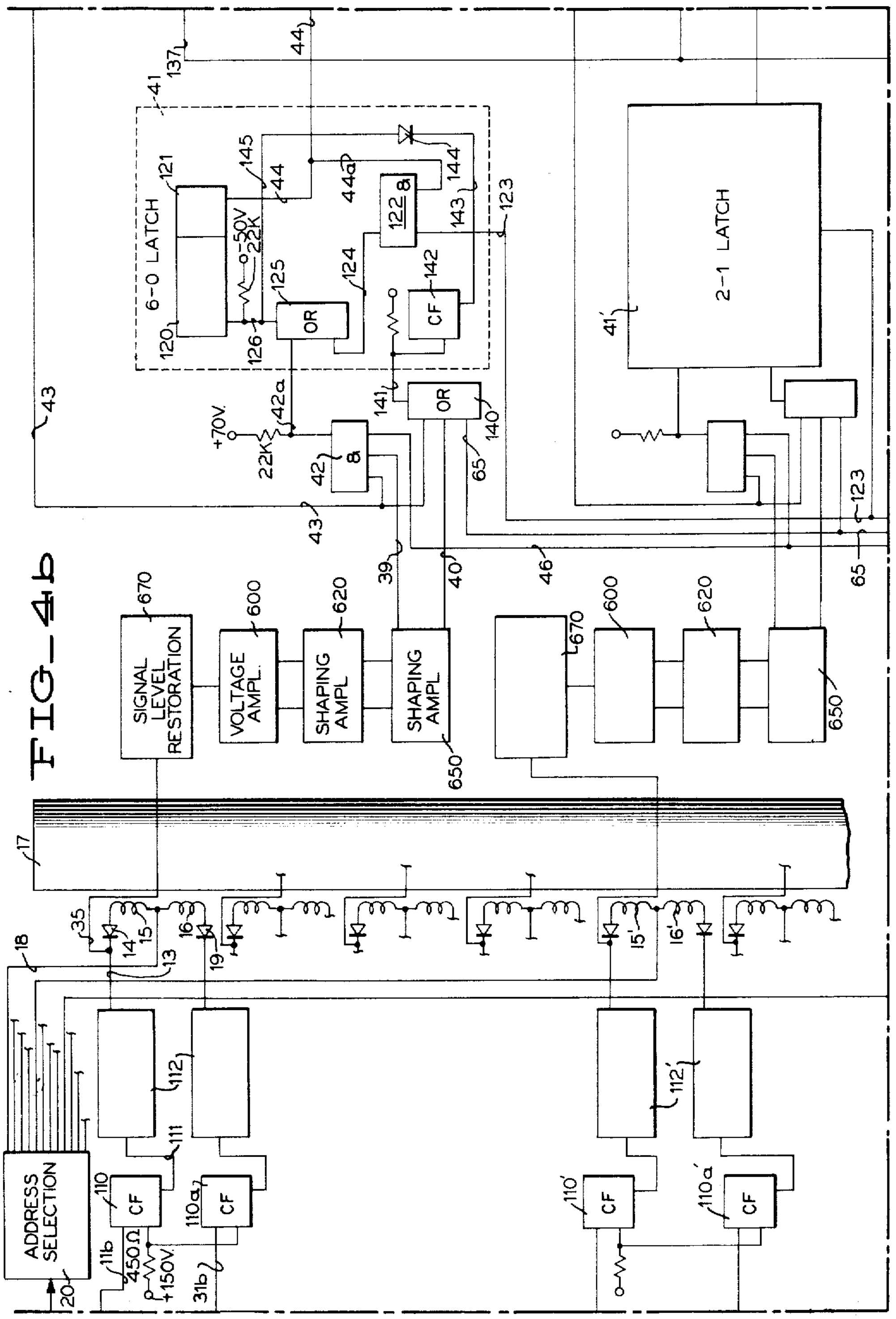
Figure 4C:
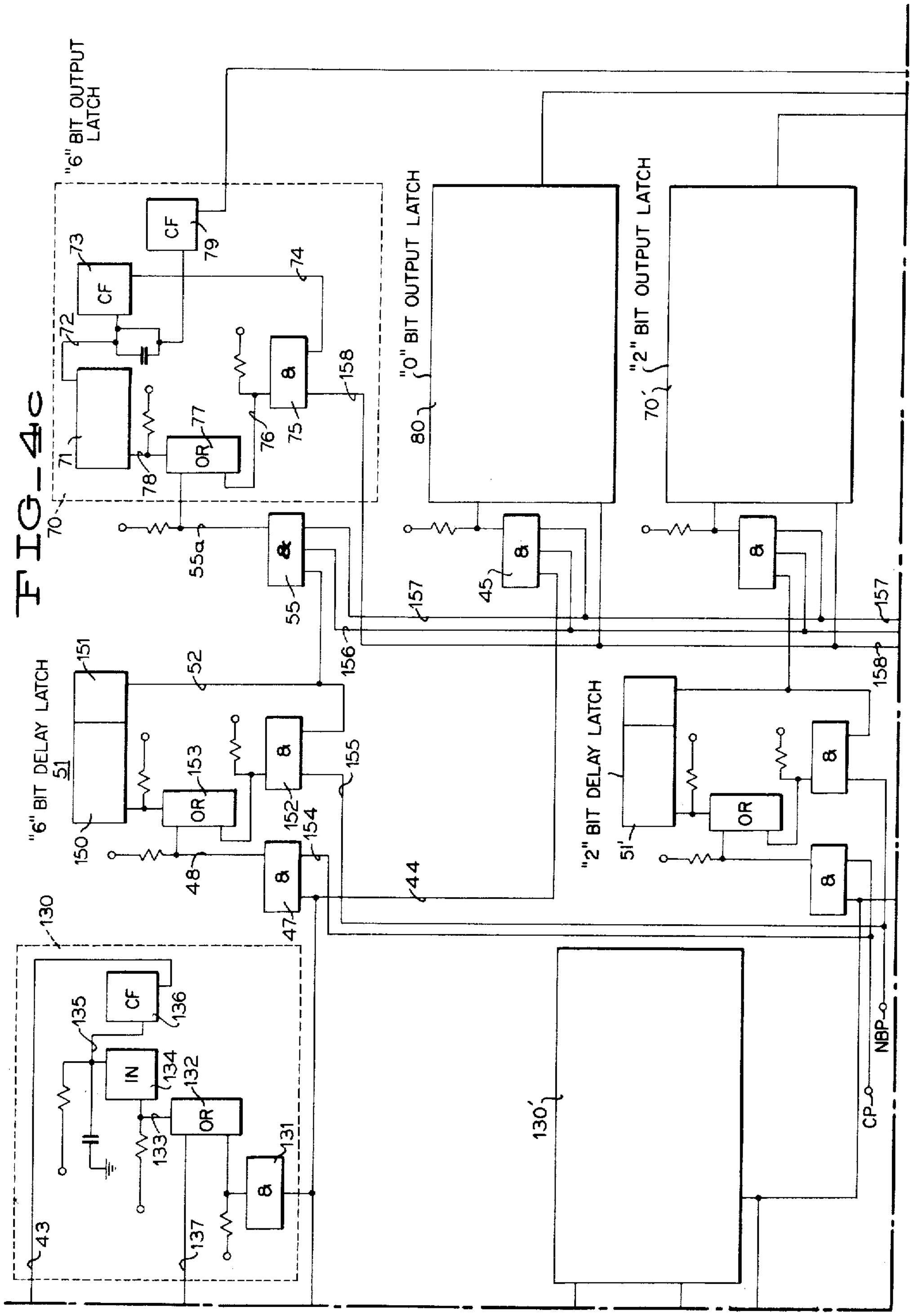
Figure 4D:
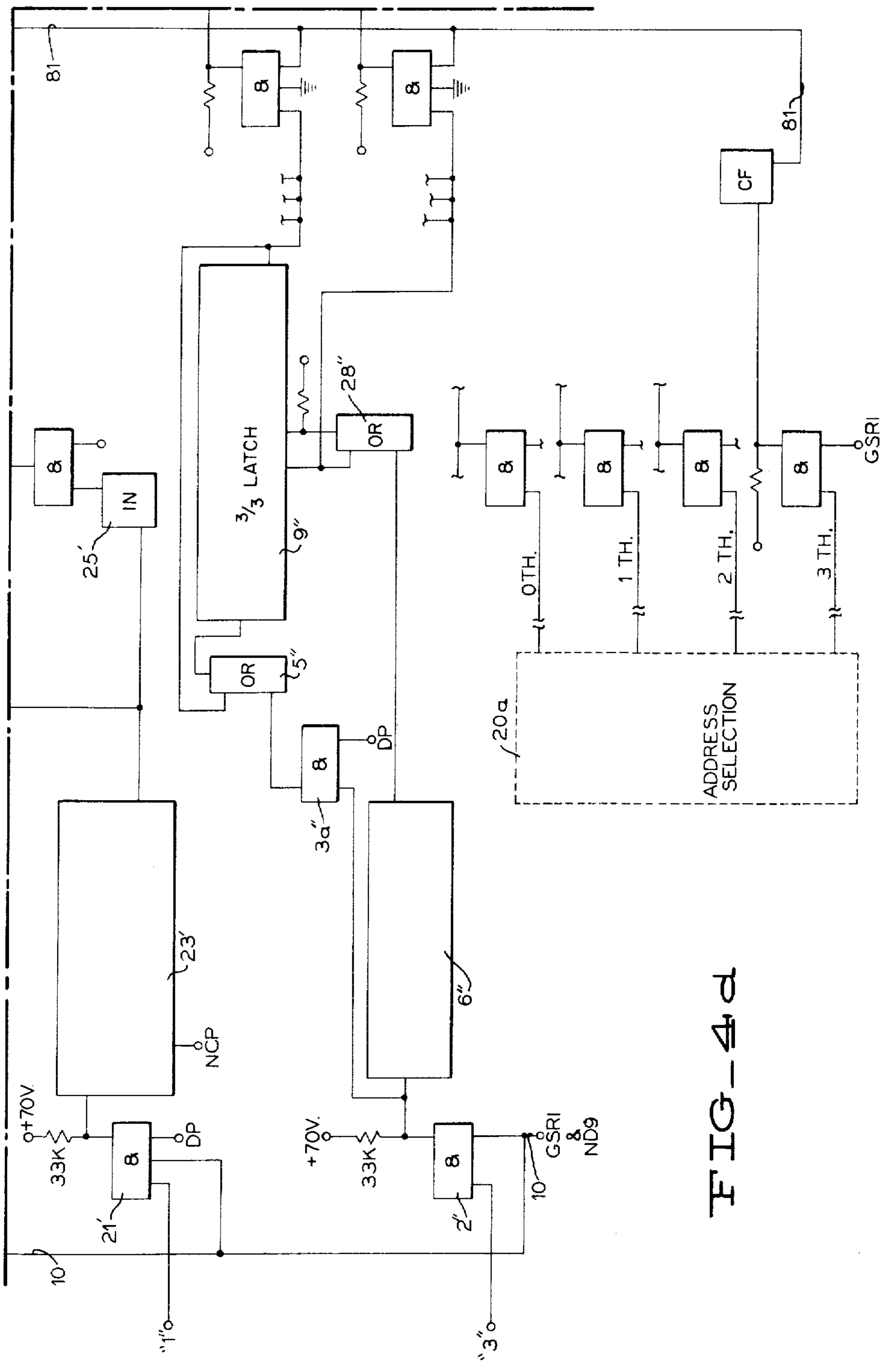
Figure 4E:
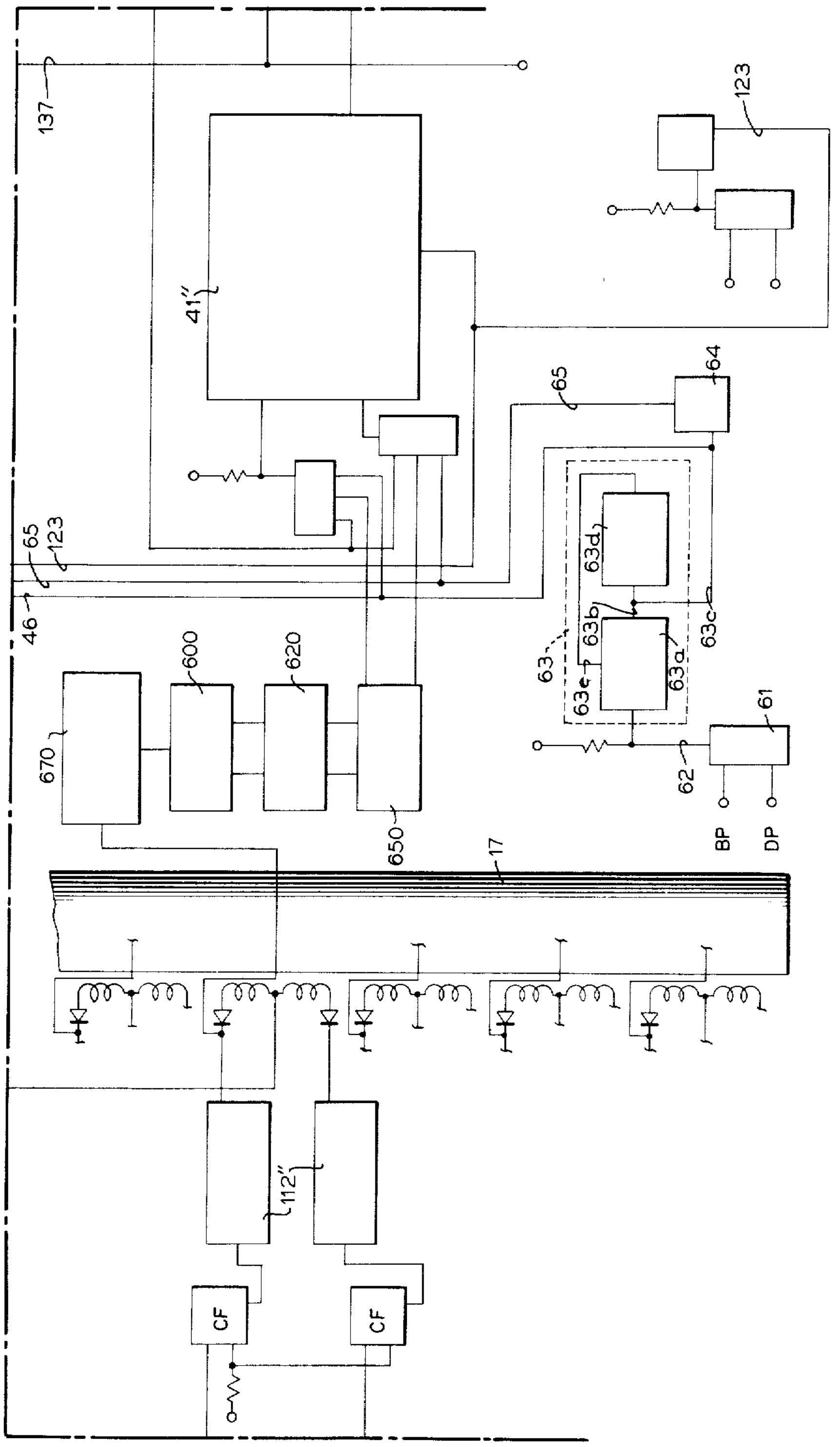

The PSA output is fed through the line 39 into an AND circuit 42 where it is gated with a feedback signal issued along a feedback line 43, and a general storage read sample pulse (GSRSP) issued along a line 46. The GSRSP pulse is timed in the manner shown in the time chart of FIG. 9 and is developed as follows:

In FIG. 4*e*, a B timed pulse BP and a D timed pulse DP are fed through an OR circuit 61, through the output thereof, through line 62 connected to the input of a delay unit 63 containing a single shot multivibrator 63*a* whose output 63*b* is fed through a delay device 63*d* which issues a delayed output through line 63*e* to turn off the single shot. The line 63*c* issues the GSRSP pulse to the line 46. There is also a negative general storage read sample pulse (NGSRSP) which is developed by passing the GSRSP pulse through an inverter 64 which issues the negative output on a line 65. When coincidence of the signals applied to the AND circuit 42, in FIG. 4*b*, is established, the AND circuit 42 issues a positive signal to turn the latch 41 on by way of line 42*a*. The latch 41 includes a grounded grid amplifier 120 of the type, shown in detail in FIG. 11, and having very fast response characteristics, a cathode follower 121 through which the output of the grounded grid amplifier is fed and passed on through the line 44.

The latch output is also fed through a branch line 44*a* and into an AND circuit 122 also fed by a reset line 123 that is effective once every word at digit 10 time.

The output of the AND circuit 122 passes through line 124, OR circuit 125, the line 126 connected to the input of the grounded grid amplifier 120. The output of the latch is also fed through delay means 130 which provides an inverted delayed output through the line 43 connected to the AND circuit 42. The delay means 130 includes diode means 131, an OR circuit 132, an inverter 134, and a cathode follower 136. Positive inputs fed through the line 44 appear as delay negative outputs on the line 43. Conversely, negative inputs fed through the line 44 appear as delayed positive outputs on the line 43. A digit 10 timed signal is applied along a line 137 connected to the OR circuit 132, the digit 10 signal serving to turn the latch 41 off at digit 10 of every word. The circuits for providing a fast turn off for the latch 41 includes an OR circuit 140 (negative AND circuit), line 141, a cathode follower 142, a line 143, a diode 144, and a line 145 connected to the input line 126 of the latch 41.

When the inputs to the OR circuit 140 are negative, the output thereof is negative to cause a fast turn off of the latch. The foregoing circuits dealing with the operation of the latch 41 provide for high-speed operations for turn on and turn off and for the alternating control of the latch in response to both positive and negative inputs, the more specific aspects of this latch control from the subject matter of a pending application. However, for the present, it will suffice to know that the operations of the latch 41 are effected in an alternating manner under control of the input signals PSA and NSA. When the latch 41 is turned on in response to the presence of a "6" bit, the latch output passes through the line 44 to turn on the "6" bit delay latch 51 in a manner to be explained. The latch 51 is used to delay the transmission of the "6" bit to the output of channel 2 until the "0" bit is ready for transmission to the channel 2. Latch 51 is a well-known type of latch and includes a double inverter, shown as block 150, a cathode follower 151, an AND circuit 152, and an OR circuit 153. The latch 51 is turned on at C pulse time by way of the AND circuit 47 in response to a "6" bit output on the line 44 together with the presence of the C timed pulse CP issued on a line 154. Six microseconds later the latch 51 is turned off by way of the AND circuit 152, in response to a negative B pulse (NBP) issued along a line 155. The turning on of the "6" bit output latch 70 is effected at A time by way of the AND circuit 55, the inputs to which include the lines 52 and lines 156 and 157. The line 156 issues a general storage read out signal (GSRO) developed in response to a computer command for a reading out operation. The line 157 issues an A timed pulse. When coincidence of these signals is established, the output from the AND circuit 55 turns on the latch 70. The latch 70 includes grounded grid amplifier 71, cathode follower 73, AND circuit 75, OR circuit 77, input line 78, and an output cathode follower 79. The latch 70 is turned on at A time by way of AND circuit 55, line 55*a*, OR circuit 77, and input line 78. The latch is turned off by AND circuit 75 at A time under control of a negative latch reset pulse (NLRP), issued along a line 158, having the timing indicated in FIG. 9. The output of the latch is fed through cathode follower 79 to the "6" bit line of channel 2 of the computer. The latch 80 is similar to and operates the same as the latch 70 except that the latch 80 is controlled to be turned on immediately in response to the presence of the "0" bit information on the line 44 while the latch 70 is turned on in response to the sampled output of the "6" bit delay latch 51.

Figure 4F:
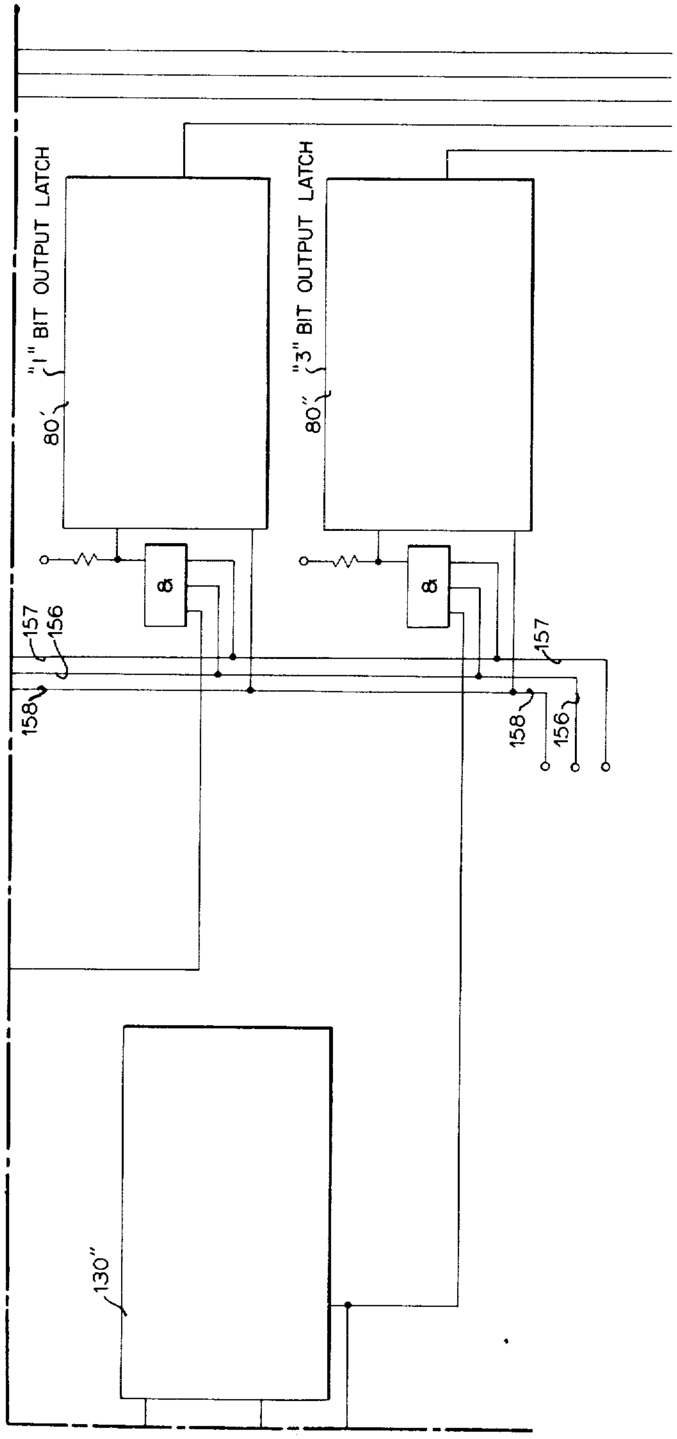

The circuits for effecting the folding and unfolding of the bits "2" and "1" are shown respectively along the bottom portions of FIGS. 4*a*, 4*b* and 4*c* and the top portions of FIGS. 4*d*, 4*e*, and 4*f*. Corresponding circuit devices and elements for the processing of the bits "2" and "1"

bear single primed reference numerals and letters. For example, the inversion means 6′ for the "2" bit, in FIG. 4*a*, corresponds to the inversion means 6 for the "6" bit. Similarly, the 2/1 write latch 9′ corresponds to the 6/0 write latch 9. The output latches for the "2" and "1" bits are identified respectively as 70′ and 80′, shown in FIGS. 4*c* and 4*f*. The processing of the "3" bit, as earlier mentioned, is effected in a normal manner for the reasons earlier stated. The circuit devices and elements associated with the processing of the "3" bit bear double primed reference notations. For example, the 3—3 write latch, in FIG. 4*d*, is identified as 9″.

The chart of FIG. 9 shows the various timings and waveforms relating to the reading and recording of bit information, specifically bits "2" and "1" as constituted in the word comprised of digits +008252, the + sign having zero significance. Thus, in the order stated, the "+" is constituted of bits "2" and "1," the next two zeros are each constituted of bits "2" and "1," the eight of bits "6" and "2," the two of bits "2" and "0," the five of bits "3" and "2," and finally the two of bits "2" and "0." The bits "6" and "3" forming bit portions respectively of the digits 8 and 5 are not considered in this chart. The first two waveforms at the top of the chart show the timings of the "2" and "1" bit information as fed by channel 1 of the computer. The third waveform shows the output from the "2" bit delay latch 23′. Immediately below the last waveform mentioned there are two waveforms complementary to each other; one identified as record 15′ and the other erase 16′, the former showing the record current for writing bits "2" and "1" while the latter shows the erase current. As the bit information is read from the drum, the read head accordingly issues positive and negative waveforms that are fed into the unit 670, shown in FIG. 4*b*, which is a voltage amplifier. The output from the latter is fed into the shaping amplifier unit 620, giving the positive and negative waveforms shown. The latter, in turn, will feed into the shaping amplifier 660, giving output waveforms PSA and NSA. These waveforms are then sampled by the GSRSP timed signals to operate the latch 41′, delay latch 51′, and the output latches 70′, 80′, operating according to the timings shown in the bottom portions of the chart. It may be appreciated from FIG. 2 that the encoding and decoding scheme is effected within three digit time intervals. In other words, encoding of the bits is effected three digit intervals early to enable the decoding bit outputs to be presented on time to channel 2 of the computer.

The write latch 9 is designed to provide concurrent negative outputs on the output lines 11 and 31 for an interval of .6 microsecond during switching operations of the latch while it is being turned on and while it is being turned off. During this switching interval, the negative output prevents flow of current through the heads at each change and, thus, eliminates a magnetic interference caused by the physical length of the magnetic flux while recording on the surface of the magnetic medium. This interval also eliminates the possibility of circuit overload that might arise should the record and erase coils conduct at the same time.

From the foregoing, recording in the NRZ system requires two control signals, one the inverse of the other for controlling the grids of the record and erase tubes which supply current to the head coils. These signals are developed by use of the double latch. The double latch is turned on by the positive signal indicating bit presence and turned off by the positive signal indicating bit absence. Since a positive signal is required to turn the latch off, all information bits must be in inverted form as well as normal form. If there is bit presence for early information, the pulse DP turns on the latch; if there is bit presence for late information, the pulse BP turns on the latch. If there is no bit presence, the inverted information signals act similarly to turn off the latch at the above times.

It may be obvious to those skilled in the art that, even though the preferred form of the invention employs the NRZ system, other forms of recording may also be employed; e.g., the discrete spot system.

*Amplifier 600*

The amplifier unit 600 is an RC coupled amplifier comprised of two stages, namely, 601 and 602, used, respectively, as an amplifier and cathode follower and each stage including a 5965 type tube. The amplifier stage 601 is operated as a class A amplifier so that any change in the input is reflected at the output. A signal of approximately a millivolt applied to the input of the amplifier causes a positive shift at point 604 which provides a positive swing on the grid **601*b* to increase conduction in the stage 601. Accordingly, the voltage on plate 601*a* falls to apply a negative shift, by way of capacitor 605 to grid 601*e*; thereby decreasing conduction through the write section of the stage 601. The effect of the latter causes a positive shift at point 606, which shift passes through capacitor 607 to both grids 602*a* and 602*b* of the cathode follower 602, thus providing a positive output at terminals 608 and 609**. This output is similar to the input signal but of different voltage level.

During a reading selection from general storage, the input to the amplifier 601 changes from +60 volts to +85 volts. The 25 volt swing drives the amplifier into full conduction. The resultant swing at the plate **601*a* cuts off the write section of the amplifier and causes a surge signal at the output. To limit this surge and to aid in tube recovery, diode clipping means 610 and 611 are employed at the grid input of the amplifier 601. Point 612 is normally at +200 millivolts due to the associated voltage divider network. When read selection occurs, the input capacitor 613 charges through diode 610 so that the voltage on the capacitor is +85 volts. Point 604 is normally at ground and tends to rise but cannot go above +200 millivolts because of the diode 610. Point 614 is held at —200 millivolts because of the associated voltage divider network tied to —70 volts. When selection is dropped, the diode 611 discharges the capacitor 613 to +60 volts; thus point 604** varies between +200 millivolts and —200 millivolts.

*Shaping Amplifier 620*

The unit identified as 620 is employed primarily as a peaking amplifier and comprises two stages with each stage containing one-half section of each of two tubes, namely, a type 6350 and a type 6211. This peaking amplifier accepts the outputs of the voltage amplifier contained in the box 600. The first stage includes tube sections **623*a* and 624*a* and accepts negative inputs at an input terminal 621 to provide negative outputs at an output terminal 625. The second stage includes tube sections 623*b* and 624*b* and accepts positive inputs at an input terminal 622 to provide positive outputs at output terminal 626. In stage 1, with no signal input on terminal 621, the latter will be held at ground level under the control of clamping diode 630. When a positive signal appears at point 602*c* of the voltage amplifier unit 600, coupling capacitor 614 charges since the input terminal 621 is clamped at ground. However, a negative swing will drive the input terminal 621 as far negative as —3 volts owing to the action of the clamp 631. The output signal at terminal 625 occurs at the peak of the input signal applied on terminal 621, which input signal is inverted and appears as a positive signal at point 627 normally held at —6 volts owing to the action of clamp diode 639. Point 628, on the other hand, is normally at —3 volts owing to the action of clamp diode 640; coupling diode 629 is thus reversely biased. The voltage at point 628 can only be effected if point 627 rises above 3 volts. Thus the circuit is insensitive to voltage signals of less than 3 volts. As point 628 attempts to go above ground, grid current begins to flow keeping point 628 close to ground level. When input terminal 621 goes positive, the bias voltage levels are restored by the action of the diode clamps 630 and 631. A positive output is developed at the output terminal 626 in response to the output of the voltage amplifier unit 600 when the latter swings positive. With no input signal at input terminal 622, the grid of section 623b is clamped at −3 volts owing to the action of diode 633. A positive signal swing will only drive the input to ground level owing to the action of diode 634. When the output of the voltage amplifier unit 600 appears at point 602c, the input terminal 622 goes positive and appears inverted at point 635, which point is normally clamped at +3 volts by means of clamp diode 636. Point 637 is normally clamped at ground by means of clamp diode 638. This makes the circuit insensitive to signals of less than 3 volts. The negative signal at point 637 is inverted and appears as a positive signal on the output terminal 626**.

*Shaping Amplifier 650*

The unit 650 behaves as a shaping amplifier. It has two stages and each is comprised of sections of tube types 6211 and CF502. Stage 1 includes sections 651a and 652a. This stage accepts negative input signals on an input terminal 653 and issues positive output signals on output terminal 654. Stage 2 includes sections 651b and 652b and accepts positive signals on input terminal 655 and issues negative output signals on output terminal 656. The input terminal 653 is clamped at ground potential by means of a diode clamp 660. The negative signal swing is limited to −3 volts by virtue of clamp diode 661. The voltage excursion at point 662 is between −50 volts and +10 volts to drive the grid of the cathode follower section 652a to thereby provide a positive output signal at terminal 654. This positive output indicates a change to a bit presence and is switched to turn the read latch on. Input terminal 655 is normally clamped at −3 volts by means of diode clamp 662. The positive voltage excess is limited to ground because of grid current flow as the input tends to go above ground. The negative signal appearing at point 663 is clamped between +10 volts and −50 volts to drive the grid of cathode follower section 652b. The negative output at the output terminal 656 indicates a change to bit absence and is switched to turn the read latch off.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In apparatus of the character described having a plurality of data lines for transmitting signals representing coded data, a rotatable magnetizable drum divided into a plurality of tracks, and including timing tracks for issuing timed signals, a plurality of heads, one associated with each track, each head including a record coil and an erase coil: the combination comprising a plurality of latches each having a pair of inputs respectively first and second, an on output, and an off output, the on output and the off output being effective respectively in response to the on and off conditions of the associated latch; means connecting a different pair of lines of said plurality of data lines respectively to a different pair of latch inputs, each pair of connected inputs controlling the switching of its associated latch to an on condition in accordance with the presence of coded signals on the connected pair of lines and to an off condition in accordance with the absence of said last-named signals; switching means connected intermediate said pair of latch inputs and the connected pair of lines and gated by said timed signals to switch the latch either on or off in accordance with the presence or absence of the coded signal applied to the first and second inputs; and means connecting the on and off outputs of each latch respectively to the record and erase coils of each head and operable to energize either the record coil or the erase coil according to the on and off conditions of said latch to cause appropriate successive recordings along the associated tracks.

2. In apparatus of the character described having a plurality of data lines for transmitting signals representing coded data, a rotatable magnetizable drum divided into a plurality of tracks, and including timing tracks for issuing timed signals, a plurality of heads, one associated with each track, each head including a record coil and an erase coil; the combination comprising a plurality of latches each having a pair of inputs respectively first and second, an on output, and an off output, the on output and the off output being effective respectively in response to the on and off conditions of the associated latch; means connecting a different pair of lines of said plurality of data lines respectively to a different pair of latch inputs, each pair of connected inputs controlling the switching of its associated latch to an on condition in accordance with the presence of coded signals on the connected pair of lines and to an off condition in accordance with the absence of said last-named signals; switching means connected intermediate said pair of latch inputs and the connected pair of lines and gated by said timed signals to switch the latch either on or off in accordance with the presence or absence of the coded signal applied to the first and second inputs; delay means interposed between said second input and the associated connected line to delay the transmission of the coded signals to said second input; and means connecting the on and off outputs of each latch respectively to the record and erase coils of each head and operable to energize either the record coil or the erase coil according to the on and off conditions of said latch to cause appropriate successive recordings along the associated tracks.

3. In apparatus of the character described having a plurality of data lines for transmitting signals representing coded data, a rotatable magnetizable drum divided into a plurality of tracks, and including timing tracks for issuing timed signals, a plurality of heads, one associated with each track, each head including a record coil and an erase coil: the combination comprising a plurality of latches each having a pair of inputs respectively first and second, an on output, and an off output, the on output and the off output being effective respectively in response to the on and off conditions of the associated latch; means connecting a different pair of lines of said plurality of data lines respectively to a different pair of latch inputs, each pair of connected inputs controlling the switching of its associated latch to an on condition in accordance with the presence of a coded signal on either line of the connected pair of lines and to an off condition in accordance with the absence of said last-named signals; switching means connected intermediate said pair of latch inputs and the connected pair of lines and gated by said timed signals to switch the latch either on or off in accordance with the presence or absence of the coded signal applied to the first and second inputs; delay means interposed between said second input and the associated connected line to delay the transmission of the coded signals to said second input; means connecting the on and off outputs of each latch respectively to the record and erase coils of each head and operable to energize either the record coil or the erase coil according to the on and off conditions of said latch to cause appropriate successive recordings along the associated tracks, and means associated with each latch for rendering the associated on and off outputs ineffective for an interval of time during the switching of the latch to prevent recording during said interval.

4. In a system for recording data characters, each represented by the presence and absence of electrical signals on a plurality of input data lines comprising a rotating magnetic drum containing a plurality of character positions, each successively available for a time "*t*" for recording of input data, a plurality of recording heads positioned adjacent said magnetic drum for magnetically recording an input character in a selected character position, a first bistable storage connected to one of said input data lines and operable in the presence of an electrical signal to provide an output to one of said recording heads, timing means for resetting said first bistable storage a predetermined time after the beginning of said character position, a second bistable storage connected to another of said input data lines and operable in the presence of an electrical signal to provide an output, means connecting said second bistable storage to said first bistable storage to operate said first bistable storage for a period of time equal to said predetermined time and subsequent to the original predetermined period of said first bistable device, and a character address generator for energizing said magnetic recording heads when a preselected character position moved beneath said recording heads and an output is present from said first bistable storage.

References Cited in the file of this patent

UNITED STATES PATENTS

| | | |
|---|---|---|
| 2,764,463 | Lubkin et al. | Sept. 25, 1956 |
| 2,853,698 | Nettleton et al. | Sept. 23, 1958 |
| 2,896,192 | Husman | July 21, 1959 |
| 2,955,280 | Hughes | Oct. 4, 1960 |

OTHER REFERENCES

"Proceedings of the Eastern Joint Computer Conference," published by A.I.E.E., December 8–10, 1954. (Pages 16–21 relied on.)